(12) United States Patent
Kawano et al.

(10) Patent No.: US 12,206,921 B2
(45) Date of Patent: Jan. 21, 2025

(54) THROUGHPUT ESTIMATION APPARATUS, THROUGHPUT ESTIMATION METHOD AND PROGRAM

(71) Applicant: NIPPON TELEGRAPH AND TELEPHONE CORPORATION, Tokyo (JP)

(72) Inventors: Taichi Kawano, Tokyo (JP); Masahiro Kobayashi, Tokyo (JP); Shigeaki Harada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/251,345

(22) PCT Filed: Nov. 5, 2020

(86) PCT No.: PCT/JP2020/041383
§ 371 (c)(1),
(2) Date: May 1, 2023

(87) PCT Pub. No.: WO2022/097229
PCT Pub. Date: May 12, 2022

(65) Prior Publication Data
US 2024/0007691 A1    Jan. 4, 2024

(51) Int. Cl.
*H04N 21/24* (2011.01)
*H04N 21/2385* (2011.01)
(Continued)

(52) U.S. Cl.
CPC ..... *H04N 21/2402* (2013.01); *H04N 21/2385* (2013.01); *H04N 21/2662* (2013.01); *H04N 21/44209* (2013.01); *H04N 21/64738* (2013.01)

(58) Field of Classification Search
CPC .......... H04N 21/2402; H04N 21/2662; H04N 21/44209; H04N 21/2385; H04N 21/64738
See application file for complete search history.

(56) References Cited

U.S. PATENT DOCUMENTS 11,159,804 B1 * 10/2021 Strowe ................. H04N 19/164
2008/0285574 A1 * 11/2008 Teener ................... G09G 5/006
370/401

(Continued)

FOREIGN PATENT DOCUMENTS

| JP | 2012-049598 | 3/2012 |
| JP | 2019-016961 | 1/2019 |
| JP | 2019-121847 | 7/2019 |

OTHER PUBLICATIONS

Telecommunication Standardization Sector of ITU, "Parametric bitstream-based quality assessment of progressive download and adaptive audiovisual streaming services over reliable transport", Recommendation ITU-T p. 1203, Oct. 29, 2017.

(Continued)

*Primary Examiner* — Jason Salce
(74) *Attorney, Agent, or Firm* — IPUSA, PLLC

(57) ABSTRACT

A throughput estimation apparatus includes a memory and a processor configured to execute estimating a QoE (quality of experience) for each of a plurality of selection candidates for a parameter set related to a quality of a video to be distributed via a network; and estimating a throughput required for satisfying a target QoE by using, as inputs, the estimated QoE for each of the selection candidates, the parameter set for each of the selection candidates, and the target QoE.

5 Claims, 6 Drawing Sheets

(51) Int. Cl.
     *H04N 21/2662*    (2011.01)
     *H04N 21/442*     (2011.01)
     *H04N 21/647*     (2011.01)

(56) References Cited

U.S. PATENT DOCUMENTS

| | | | | |
|---|---|---|---|---|
| 2009/0034426 | A1* | 2/2009 | Luft | H04N 21/2407 370/252 |
| 2010/0299552 | A1* | 11/2010 | Schlack | H04N 21/2404 709/224 |
| 2013/0067109 | A1* | 3/2013 | Dong | H04L 43/08 709/231 |
| 2015/0264098 | A1* | 9/2015 | Dao | H04W 40/08 709/231 |

OTHER PUBLICATIONS

Kazuhisa Yamagishi and Takanori Hayashi, "Parametric Quality-Estimation Model for Adaptive-Bitrate-Streaming Services", IEEE Transactions on Multimedia, vol. 19, No. 7, 2017.

* cited by examiner

Fig. 3

| ID | VIDEO BIT RATE [kbps] | VIDEO RESOLUTION [pixel] | VIDEO FRAME RATE [fps] | AUDIO BIT RATE [kbps] |
|---|---|---|---|---|
| 0 | 100 | 18204 | 30 | 128 |
| 1 | 300 | 409600 | 30 | 128 |
| 2 | 900 | 921600 | 30 | 128 |
| 3 | 2700 | 2073600 | 30 | 128 |
| 4 | 8100 | 3686400 | 30 | 128 |

Fig. 4

| ID | VIDEO BIT RATE [kbps] | VIDEO RESOLUTION [pixel] | VIDEO FRAME RATE [fps] | AUDIO BIT RATE [kbps] | QoE |
|---|---|---|---|---|---|
| 0 | 100 | 18204 | 30 | 128 | 2.44 |
| 1 | 300 | 409600 | 30 | 128 | 2.94 |
| 2 | 900 | 921600 | 30 | 128 | 3.81 |
| 3 | 2700 | 2073600 | 30 | 128 | 4.27 |
| 4 | 8100 | 3686400 | 30 | 128 | 4.41 |

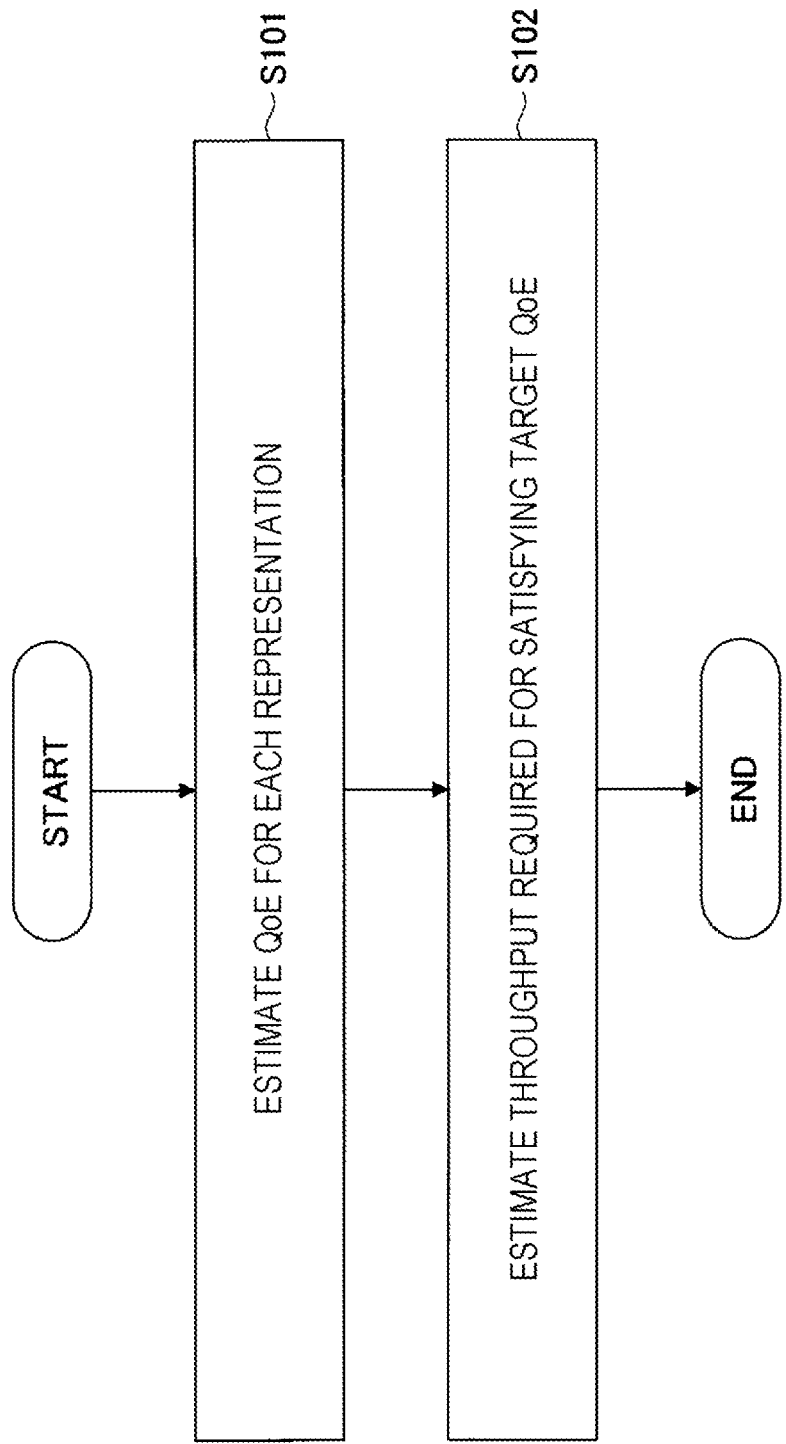

THROUGHPUT ESTIMATION APPARATUS, THROUGHPUT ESTIMATION METHOD AND PROGRAM

TECHNICAL FIELD

The present invention relates to a throughput estimation apparatus, a throughput estimation method, and a program.

BACKGROUND ART

Various communication services (telephone, video distribution, Web, video conference, desktop virtualization, IoT, and the like) for transferring data such as a video and an audio (including a voice) between terminals or between a server and a terminal via a network have become widespread.

In a case where a network resource shortage, a failure, a malfunction, or the like occurs in a communication service using a video or an audio, the network quality (a throughput, a packet loss, a packet transfer delay, or the like) deteriorates, and the quality (quality of experience, QoE) that a viewer experiences with respect to a video or an audio deteriorates.

Many video distribution services adopt adaptive bit rate video distribution in which distribution is performed while changing a bit rate of a video or an audio (a data amount per unit time when reproducing a video or an audio) according to a state of a throughput (a data transfer amount per unit time). In this distribution method, pieces of data of videos or audios having different representations (in a case of a video, a set of a codec, a bit rate, a resolution, a frame rate, and the like, and in a case of an audio, a set of a codec, a bit rate, and the like) are arranged in a distribution server in advance. In distribution, a terminal requests a server for a representation corresponding to an appropriate bit rate according to a situation of a throughput each time, and receives and reproduces a video and an audio while switching the bit rate. For this reason, in a case where a low bit rate is selected due to a decrease of a throughput, an image quality decreases or an audio quality decreases. Further, in a case where the video/audio data transfer required for reproduction is not in time, buffering processing is performed due to a shortage of video/audio data accumulated in a buffer of a reception terminal, and as a result, waiting for a reproduction start or a reproduction stop occurs. Thereby, a QoE deteriorates.

While QoE degradation affects engagement (a viewing time, a viewing stop, a viewing cancellation, and the like) of a viewer, a QoE required to keep engagement appropriate varies depending on different contexts such as a user, contents, and a charge system. Thus, it is desirable to provide a service with an appropriate QoE for each context.

For this reason, in order to improve engagement of a user, it is beneficial for a video distribution provider to use a network capable of providing a sufficient throughput to satisfy a desired QoE (target QoE). In addition, it is desirable that a network provider provide a network with a sufficient throughput to satisfy the target QoE in order to make the video distribution provider use the network of the own network provider more frequently. However, in a case where an excessive throughput is provided, the target QoE can be satisfied, and on the other hand, an equipment cost of the network increases. Thus, it is important to recognize a required minimum throughput and to design and control a network based on the throughput from viewpoints of a QoE and a cost.

Therefore, there is a need for a technique of estimating a required minimum throughput for achieving a certain QoE.

In related art, there is a technique disclosed in Patent Literature 1 as a technique of modeling a relationship between a throughput and a QoE. The present technique is a technique related to a model that estimates a QoE by using a throughput as an input. By using a correspondence relationship between a throughput of the model and a QoE, it is possible to derive a throughput corresponding to a certain QoE.

Further, as a technique of modeling a relationship between a bit rate and a QoE, there are techniques disclosed in Non Patent Literature 1 and Non Patent Literature 2. The present technique is a technique of estimating a QoE by using, as inputs, quality parameters such as bit rates of a video and an audio, a video resolution, and a video frame rate. In general, a bit rate at which a total value of bit rates of a video and an audio is equal to or lower than a throughput is selected. In this case, by considering, as a throughput, the total value of the bit rates of the selected video and audio and using a model for the bit rate and the QoE, it is possible to derive a corresponding throughput from the QoE.

CITATION LIST

Patent Literature

Patent Literature 1: JP 2019-121847 A

Non Patent Literature

Non Patent Literature 1: Parametric bitstream-based quality assessment of progressive download and adaptive audiovisual streaming services over reliable transport, ITU-T P.1203

Non Patent Literature 2: K. Yamagishi and T. Hayashi, "Parametric Quality-Estimation Model for Adaptive-Bitrate Streaming Services," IEEE Transactions on Multimedia, 2017. DOI: 10.1109/TMM.2017.2669859

SUMMARY OF INVENTION

Technical Problem

However, since the technique of Patent Literature 1 estimates a QoE by using only a throughput as an input, a difference in representation cannot be considered. In the adaptive bit rate video distribution, the bit rate is changed by switching the representation according to a situation of the throughput. On the other hand, the selectable representation differs depending on a service, contents, and the like. For this reason, even in a case where the throughput is the same, the same representation is not necessarily selected, and the same QoE is not necessarily obtained. For example, in a case where a throughput is high and a representation including a high bit rate can be selected, when a high bit rate is selected, an image quality increases and a QoE increases. On the other hand, even if a throughput is high, in a case where a representation including a high bit rate is not an option, a high bit rate is not selected. As a result, an image quality does not increase, and a QoE does not increase. For this reason, in the existing technique, it is difficult to accurately estimate a throughput depending on the representation.

In addition, in the techniques of Non Patent Literature 1 and Non Patent Literature 2, on a premise that a bit rate equivalent to a throughput is selected, a relationship between a QoE and a throughput can be derived from a model for a bit rate and a QoE. However, a capacity of a server is finite, and the selectable bit rates are limited to several types. For this reason, for a throughput section in which a bit rate equivalent to a throughput does not exist, a bit rate far from the throughput is selected, or a plurality of bit rates are selected while being switched. Thus, in the existing technique in which a relationship between a bit rate and a QoE is modeled, it is difficult to accurately estimate a throughput from a QoE.

The present invention has been made in view of the above points, and an object of the present invention is to improve accuracy of estimation of a throughput required for satisfying a certain QoE.

Solution to Problem

Therefore, in order to solve the above problems, there is provided a throughput estimation apparatus including: a QoE estimation unit that estimates a QoE for each of a plurality of selection candidates for a parameter set related to a quality of a video to be distributed via a network; and a throughput estimation unit that estimates a throughput required for satisfying a target QoE by using, as inputs, the QoE which is estimated by the QoE estimation unit for each of the selection candidates, the parameter set for each of the selection candidates, and the target QoE.

Advantageous Effects of Invention

It is possible to improve accuracy of estimation of a throughput required for satisfying a certain QoE.

BRIEF DESCRIPTION OF DRAWINGS

FIG. 3 is a diagram illustrating a configuration example of representation information.

FIG. 4 is a diagram illustrating a configuration example of QoE estimation information which is output from a QoE estimation unit 11.

FIG. 6 is a flowchart for explaining an example of a processing procedure executed by the throughput estimation apparatus 10.

DESCRIPTION OF EMBODIMENTS

Figure 1:
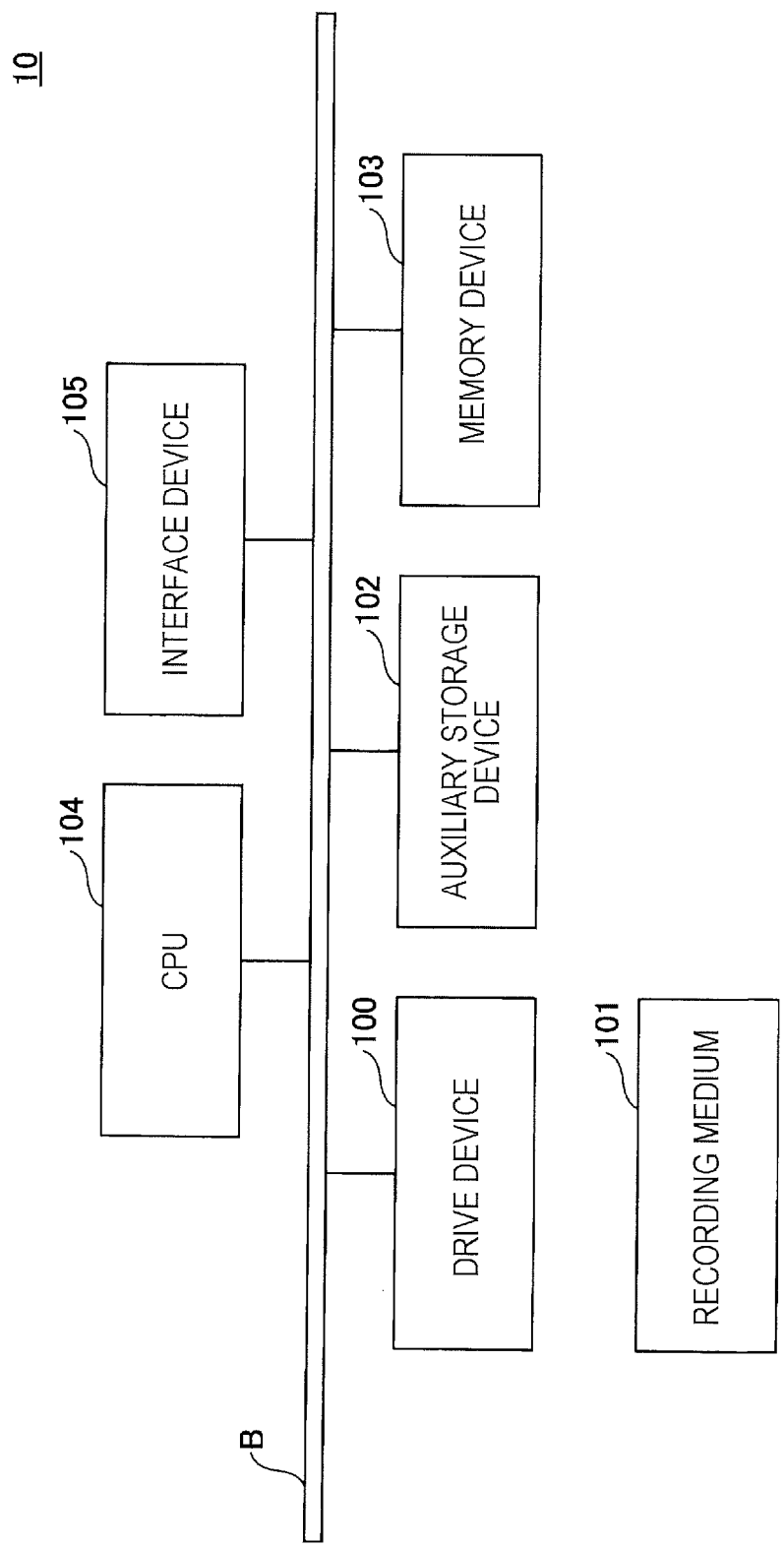
FIG. 1 is a diagram illustrating a hardware configuration example of a throughput estimation apparatus 10 according to an embodiment of the present invention.

Hereinafter, an embodiment of the present invention will be described with reference to the drawings. FIG. 1 is a diagram illustrating a hardware configuration example of a throughput estimation apparatus 10 according to an embodiment of the present invention. The throughput estimation apparatus 10 in FIG. 1 includes a drive device 100, an auxiliary storage device 102, a memory device 103, a CPU 104, an interface device 105, and the like which are connected to each other via a bus B.

A program for implementing processing in the throughput estimation apparatus 10 is provided by a recording medium 101 such as a CD-ROM. In a case where the recording medium 101 in which the program is stored is set in the drive device 100, the program is installed from the recording medium 101 to the auxiliary storage device 102 via the drive device 100. Here, the program is not necessarily installed from the recording medium 101, and may be downloaded from another computer via a network. The auxiliary storage device 102 stores the installed program and also stores necessary files, data, and the like.

In a case where an instruction to start the program is input, the memory device 103 reads the program from the auxiliary storage device 102 and stores the read program. The CPU 104 executes a function related to the throughput estimation apparatus 10 according to the program stored in the memory device 103. The interface device 105 is used as an interface for connection to a network.

Figure 2:
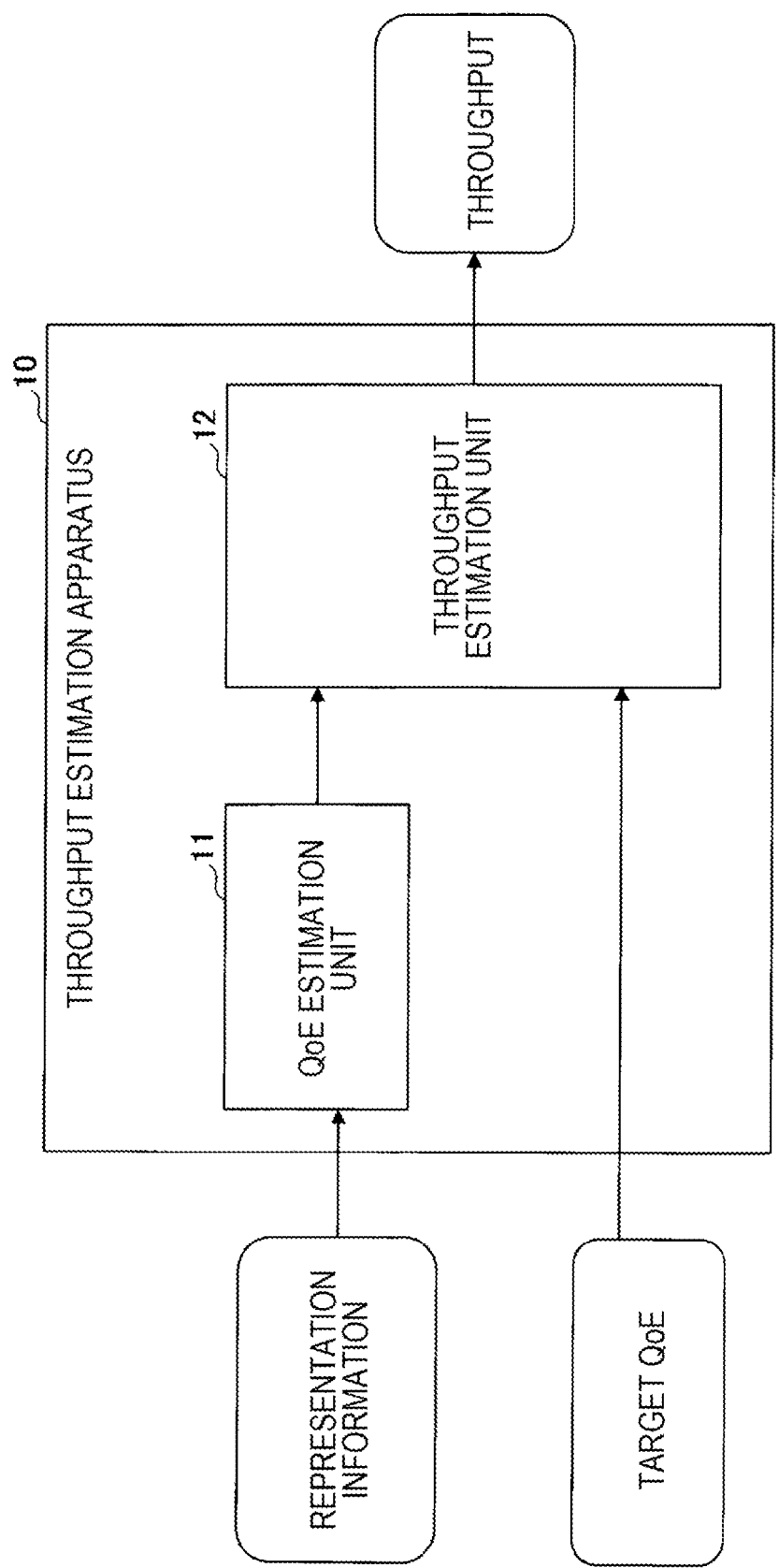
FIG. 2 is a diagram illustrating a functional configuration example of the throughput estimation apparatus 10 according to the embodiment of the present invention.

FIG. 2 is a diagram illustrating a functional configuration example of the throughput estimation apparatus 10 according to the embodiment of the present invention. In FIG. 2, the throughput estimation apparatus includes a QoE estimation unit 11, a throughput estimation unit 12, and the like in order to estimate a throughput (data transfer amount from a server to a terminal per unit time) required for satisfying a quality (quality of experience, QoE) that a user feels for adaptive bit rate video distribution. Each of these units is implemented in a case where the CPU 104 executes processing according to one or more programs installed in the throughput estimation apparatus 10. That is, each of these units is implemented by cooperation of hardware resources of the throughput estimation apparatus 10 and the program (software) installed in the throughput estimation apparatus 10.

The QoE estimation unit 11 receives representation information, estimates a QoE of each representation based on the representation information, and outputs the representation information and the estimated QoE.

FIG. 3 is a diagram illustrating a configuration example of representation information. The representation information includes one or more representations which are selectable (as selection candidates) for a certain video distribution service (hereinafter, referred to as a "target service") for which a required minimum throughput is to be estimated. One representation includes a set of parameters (parameter set) related to a quality of a video or an audio to be distributed, such as a video bit rate, a video resolution, a video frame rate, an audio bit rate, and the like.

The video bit rate and the audio bit rate are set values of data amounts per unit time of pieces of encoded data of a video and an audio. The video resolution is the number of pixels per frame (the number of pixels in a vertical direction×the number of pixels in a horizontal direction). The video frame rate is the number of frames per second.

The representation information of the target service can be acquired by a server providing the target service or a terminal using the target service. In a case where the throughput estimation apparatus 10 is provided at a location (on a network or the like) different from a location at which a server or a terminal is provided, the QoE estimation unit 11 acquires the representation information via communication with the server or the terminal. Alternatively, in a state where the throughput estimation apparatus 10 is provided on a network and a correspondence relationship between network information such as a 5-tuple (a source IP address, a destination Ip address, a protocol, a source port, a destination port) and the representation information is stored in a DB or the like in advance, by referring to the DB from the network information of the target service, the representation information of the target service may be acquired.

The QoE estimation unit 11 calculates an estimated value (hereinafter, simply referred to as "QoE") of QoE using a QoE estimation model for each representation included in the acquired representation information. As the QoE estimation model, an existing technique such as ITU-T recommendation P. 1203 that estimates a QoE by using, as an input, a video bit rate, a video resolution, a video frame rate, and an audio bit rate may be used.

FIG. 4 is a diagram illustrating a configuration example of QoE estimation information which is output from the QoE estimation unit 11. FIG. 4 illustrates an example of QoE estimation information which is output by the QoE estimation unit 11 in a case where FIG. 3 is input. As illustrated in FIG. 4, the QoE estimation information includes, for each representation, the QoE for the representation that is calculated by the QoE estimation unit 11.

The throughput estimation unit 12 estimates a required minimum throughput for satisfying a target QoE by using, as an input, the target QoE and the QoE estimation information which is output from the QoE estimation unit 11. The target QoE refers to a QoE that is targeted to improve engagement of a user in a target service.

Figure 5:
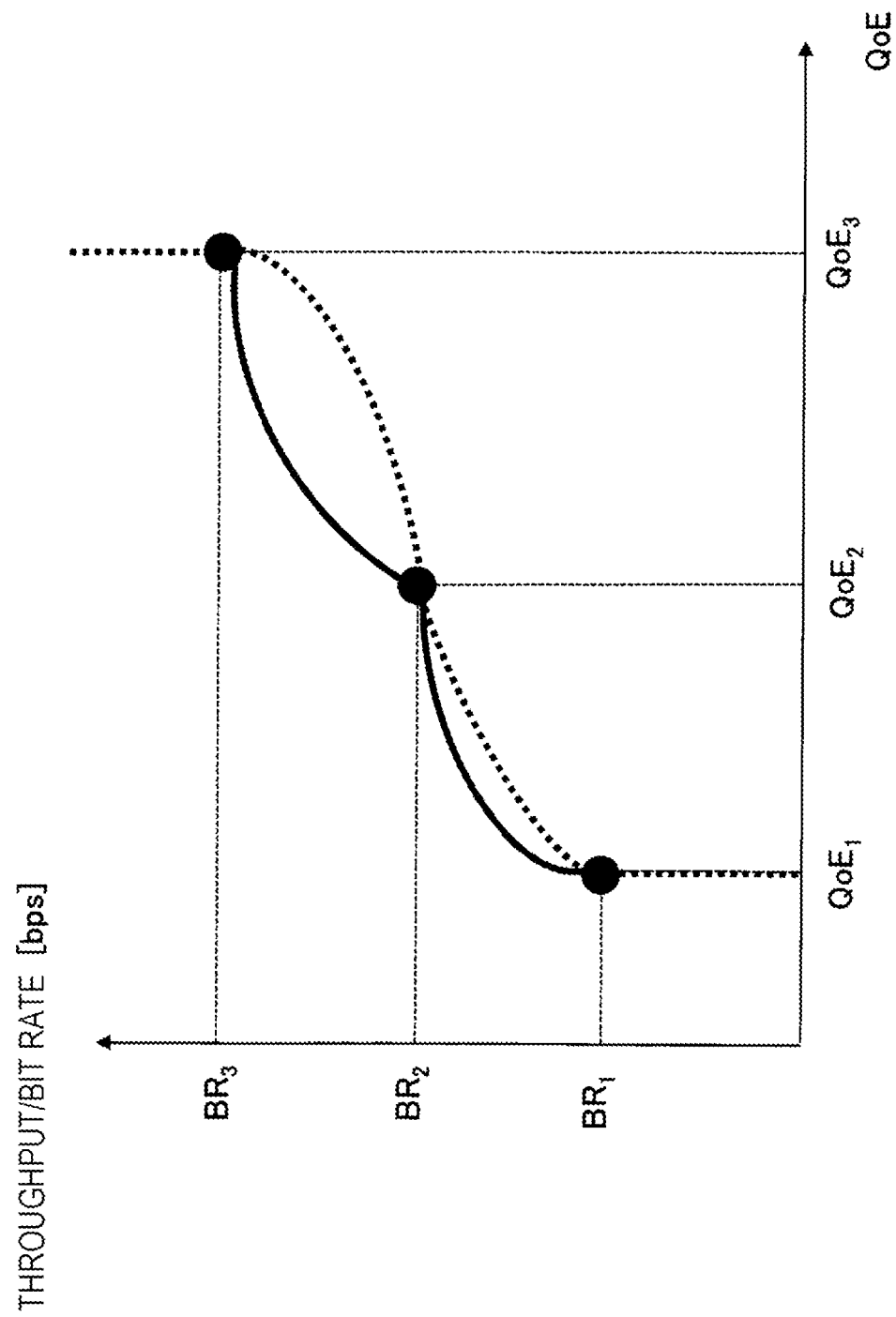
FIG. 5 is a diagram illustrating a relationship between a QoE and a throughput.

Before describing a throughput estimation method, a relationship between a QoE and a throughput will be described. FIG. 5 is a diagram illustrating a relationship between a QoE and a throughput.

A coordinate system illustrated in FIG. 5 is a coordinate system in which a horizontal axis corresponds to a QoE and a vertical axis corresponds to a throughput or a bit rate corresponding to the QoE. A dotted line indicates a relationship between a bit rate and a QoE in a case where reproduction is not stopped. In this case, it is known that an S-shaped curve that converges to a certain QoE value as the bit rate decreases or increases is obtained. Therefore, in order to satisfy a target QoE, it is only necessary that a bit rate corresponding to the target QoE is selected and reproduction is not stopped. Although it depends on a bit rate selection algorithm of adaptive bit rate video distribution, in general, in a case where a throughput equal to or slightly higher than a certain bit rate exists, the bit rate is selected. On the other hand, in practice, options of a bit rate are limited. Further, a variation in selectable bit rates varies depending on a service or content. FIG. 5 illustrates an example of three selectable bit rates. $QoE_i$ and $BR_i$ indicate an i-th QoE and an i-th bit rate in a representation list.

In FIG. 5, plotted points (black circles) are uniquely determined based on the QoE estimation information which is output by the QoE estimation unit 11. A relationship between a throughput and a QoE between the plotted points has a property (characteristic) of an upward protruding curve passing through both plotted points as indicated by a solid line. For this reason, as illustrated in FIG. 5, the relationship between the bit rate and the QoE (dotted line) and the relationship between the throughput and the QoE are different, and as a result, a throughput for satisfying a target QoE cannot be correctly derived only from the relationship between the bit rate and the QoE.

Therefore, in the present embodiment, the throughput estimation unit 12 estimates a throughput for satisfying a target QoE for all QoEs of various representation lists from the target QoE by obtaining plotted points from an output result of the QoE estimation unit 11 and performing interpolation between the plotted points (sections between QoEs estimated by the QoE estimation unit 11) by using an estimation model in which the above-described property is considered. Note that, in a case where a QoE value is lower than a minimum value of the $QoE_i$ (a QoE value on the left side of the $QoE_i$ in FIG. 5) or is higher than a maximum value of the QoE (a QoE value on the right side of the QoE 3 in FIG. 5), a throughput for satisfying the QoE without a reproduction stop does not exist in the given representation list. Therefore, in the present embodiment, the QoE value may be excluded as an input of the target QoE, or a value of the target QoE may be changed (the target QoE may be replaced with $QoE_i$ having a value closest to the target QoE).

Hereinafter, an estimation model equation of $Throughput_0$ which is a throughput between $QoE_i$ and $QoE_{i+1}$ a case where a condition with a small variation in throughput is assumed as in a bandwidth-guarantee-type network will be described.

$$\text{Line} = \frac{BR_{i+1} - BR_i}{QoE_{i+1} - QoE_i} * (QoE_{target} - QoE_i) + BR_i \quad \text{[Math. 1]}$$

$$\text{Curve} = a * (QoE_{target} - QoE_i)(QoE_{target} - QoE_{i+1})$$

$$\text{Throughput}_0 = \text{Line} + \text{Curve}$$

Here, $QoE_{target}$ indicates a target QoE. a represents a coefficient. An equation of Line represents a straight line passing through a point $(QoE_{i+1}, BR_{i+1})$ and a point $(QoE_i, BR_i)$, and an equation of Curve represents a protruding curve passing through a point $(QoE_{i+1}, 0)$ and a point $(QoE_i, 0)$ (that is, two points on a horizontal axis corresponding to two QoEs of $QoE_{i+1}$ and $QoE_i$). By adding Line and Curve, a protruding curve passing through the point $(QoE_{i+1}, BR_{i+1})$ and the point $(QoE_i, BR_i)$ is obtained. Note that the curve may be replaced with a protruding curve passing through the other two points.

Next, an estimation model equation of Throughput in a case where a condition in which a throughput significantly varies and the throughput is significantly lowered is assumed as in a best-effort-type network service will be described below.

$$\text{Throughput} = \beta + \text{Throughput}_0 * \gamma \quad \text{[Math. 2]}$$

Here, $\beta$ and $\gamma$ represent coefficients. Values of $\beta$ and $\gamma$ are set according to a stability of a throughput of a provided network. For example, the values of $\beta$ and $\gamma$ can be set with reference to a variance, a standard deviation, a reliability interval, and the like of the throughput. In addition, in a case where network design and network control are performed by bundling a plurality of communications in a shared network into one line, a variation in throughput is absorbed by a variation in another throughput due to a statistical multiplexing effect, and thus $\beta$ and $\gamma$ may be respectively set to values close to 0 and 1. Further, in a case where a lower limit of the throughput is maintained to a value equal to or higher than a certain value in consideration of a variation in the throughput when network design and network control, the values of $\beta$ and $\gamma$ may be respectively set to 0 and 1. Note that Throughput is obtained in consideration of increases in $Throughput_0$, and the estimation model equation of Throughput may be replaced with another linear equation (a quadratic function, a cubic function, or the like) or a nonlinear equation (a logarithmic function or the like).

Hereinafter, a processing procedure executed by the throughput estimation apparatus 10 will be described. FIG. 6 is a flowchart for explaining an example of a processing procedure executed by the throughput estimation apparatus 10.

In step S101, the QoE estimation unit 11 calculates a QoE for each representation included in representation information of a target service (S101). The QoE estimation unit 11 generates QoE estimation information by assigning the calculated QoE to each representation included in the representation information, and inputs the QoE estimation information to the throughput estimation unit 12.

Subsequently, the throughput estimation unit 12 calculates a throughput required for satisfying a target QoE which is given as input information, based on the QoE estimation information (S102). That is, the throughput estimation unit 12 specifies each point of FIG. 5 based on the QoE estimation information, and calculates Throughput$_0$ or Throughput by substituting the target QoE, QoE$_i$ (a maximum QoE lower than the target QoE) and QoE$_{i+1}$ (a minimum QoE higher than the target QoE) in a section including the target QoE therebetween, and BRi and BRi+1 into any one of the above-described estimation model equations.

As described above, according to the present embodiment, the target QoE and the representation information are used for estimating the throughput. Thereby, it is possible to improve accuracy of estimation of a throughput required for satisfying a certain QoE such as the target QoE.

Therefore, according to the present embodiment, it is possible to recognize the throughput for satisfying the target QoE, and it is possible to provide a network for satisfying the target QoE by designing and controlling the network based on the throughput.

Although the embodiment of the present invention has been described in detail above, the present invention is not limited to such a specific embodiment, and various modifications and changes can be made within the scope of the gist of the present invention described in the claims.

REFERENCE SIGNS LIST 10 throughput estimation apparatus
11 QoE estimation unit
12 throughput estimation unit
100 drive device
101 recording medium
102 auxiliary storage device
103 memory device
104 CPU
105 interface device
B bus

The invention claimed is:

1. A throughput estimation apparatus comprising:
a memory; and
a processor configured to execute
estimating a QoE (quality of experience) for each of a plurality of selection candidates for a parameter set related to a quality of a video to be distributed via a network;
estimating a minimum throughput required for satisfying a target QoE by using, as inputs, the estimated QoE for each of the selection candidates, the parameter set for each of the selection candidates, and the target QoE, and
controlling the network based on the minimum throughput to satisfy the target QoE,
wherein the processor estimates a minimum throughput for satisfying the target QoE by using a model equation including a QoE and a throughput required for satisfying the QoE, the model equation being derived from the QoE for each of the selection candidates and the parameter set for each of the selection candidates, and
wherein the model equation is obtained by interpolating a section between each QoE estimated by the processor based on a property in which a relationship between a QoE and a throughput required for satisfying the QoE is a protruding curve in a coordinate system in which a vertical axis corresponds to a throughput and a horizontal axis corresponds to a QoE.

2. The throughput estimation apparatus according to claim 1, wherein the model equation is obtained by interpolating the section by adding a protruding curve passing through points which are on the horizontal axis and correspond to two QoEs of the section to a straight line passing through the section.

3. A throughput estimation method executed by a computer, the method comprising:
estimating a QoE (quality of experience) for each of a plurality of selection candidates for a parameter set related to a quality of a video to be distributed via a network;
estimating a minimum throughput required for satisfying a target QoE by using, as inputs, the QoE which is estimated by the QoE estimation procedure for each of the selection candidates, the parameter set for each of the selection candidates, and the target QoE, and
controlling the network based on the minimum throughput to satisfy the target, QoE,
wherein the method further comprises:
estimating a minimum throughput for satisfying the target QoE by using a model equation including a QoE and a throughput required for satisfying the QoE, the model equation being derived from the QoE for each of the selection candidates and the parameter set for each of the selection candidates,
wherein the model equation is obtained by interpolating a section between each QoE estimated by the processor based on a property in which a relationship between a QoE and a throughput required for satisfying the QoE is a protruding curve in a coordinate system in which a vertical axis corresponds to a throughput and a horizontal axis corresponds to a QoE.

4. A non-transitory computer-readable recording medium having computer-readable instructions stored thereon, which when executed, cause a computer to function as the throughput estimation apparatus according claim 1.

5. A throughput estimation apparatus comprising:
a memory; and
a processor configured to execute
estimating a QoE (quality of experience) for each of a plurality of selection candidates for a parameter set related to a quality of a video to be distributed via a network;
estimating a minimum throughput required for satisfying a target QoE by using, as inputs, the estimated QoE for each of the selection candidates, the parameter set for each of the selection candidates, and the target QoE, and
controlling the network based on the minimum throughput to satisfy the target QoE,
wherein the memory is configured to store a plurality of parameter sets related to the quality of the video to be distributed via the network and corresponding estimated quality of experience (QoE) values for each of the parameter sets; and
the processor is further configured to:
store the estimated QoE for each of the selection candidates in the memory;
retrieve from the memory the estimated QoE for each of the selection candidates and the parameter set for each of the selection candidates; and use the retrieved estimated QoE values and parameter sets as the inputs to estimate the minimum throughput required for satisfying a target QoE.

* * * * *